United States Patent [19]

Stoll

[11] Patent Number: 5,609,091

[45] Date of Patent: Mar. 11, 1997

[54] FLUID POWER ADVANCING UNIT

[75] Inventor: Kurt Stoll, Esslingen, Germany

[73] Assignee: Festo KG, Esslingen, Germany

[21] Appl. No.: 383,071

[22] Filed: Feb. 3, 1995

[30] Foreign Application Priority Data

Feb. 5, 1994 [DE] Germany .......................... 44 03 639.6

[51] Int. Cl.⁶ ....................................................... F01B 31/00
[52] U.S. Cl. ...................... 92/110; 92/117 R; 92/165 PR; 92/167; 92/177; 384/42
[58] Field of Search ..................... 92/110, 117 R, 92/117 A, 165 R, 165 PR, 167, 177; 384/8, 37, 42

[56] References Cited

U.S. PATENT DOCUMENTS

| 2,887,092 | 5/1959 | Brady | 92/117 R |
|---|---|---|---|
| 3,232,184 | 2/1966 | Ulrich | 92/110 |
| 3,449,910 | 6/1969 | Reynolds | 92/177 |
| 5,299,489 | 4/1994 | Obrecht et al. | 92/165 PR |

FOREIGN PATENT DOCUMENTS

| 1957442 | 5/1969 | Germany | 92/165 R |
|---|---|---|---|
| 2519251 | 11/1976 | Germany | 92/165 PR |
| 1333702 | 10/1973 | United Kingdom | 384/8 |

*Primary Examiner*—F. Daniel Lopez
*Attorney, Agent, or Firm*—Hoffmann & Baron

[57] ABSTRACT

A fluid power operated advancing unit has housing and a plunger adapted to run axially therein. The plunger is designed in the form of a three sided prismatic body at least along its length section running in the housing, said body being guided in the housing at its three side surface, whereas three transitions between respective adjacent side are not guided. The result is accordingly an extremely accurate guiding action for the plunger while simultaneously preventing rotation thereof.

19 Claims, 1 Drawing Sheet

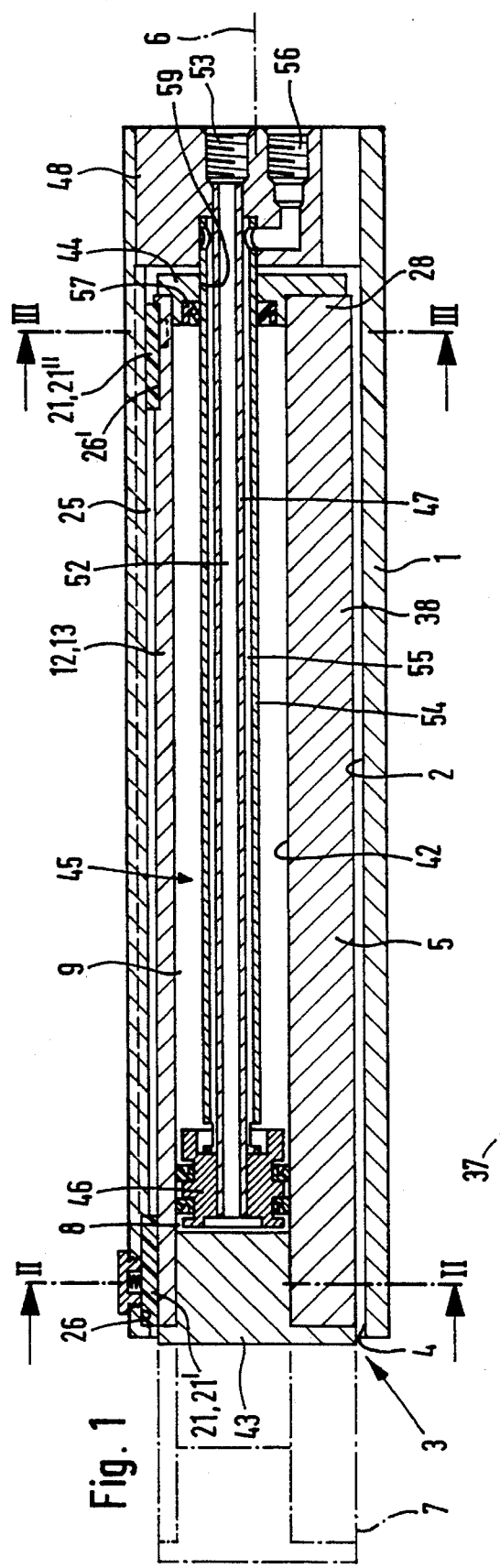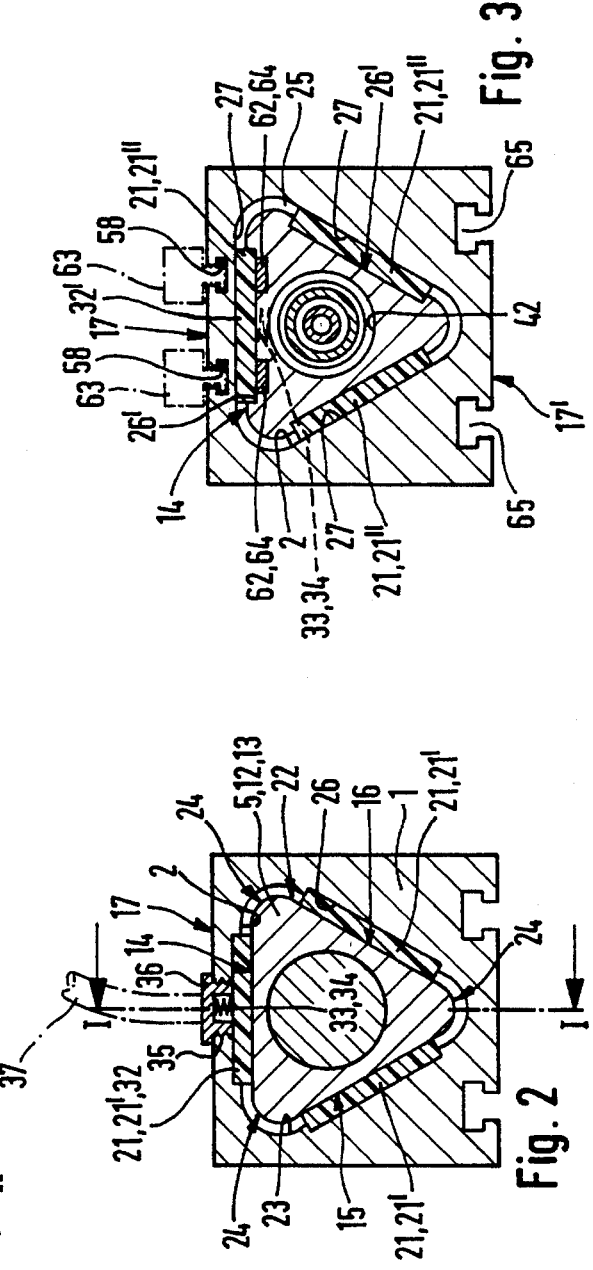

FLUID POWER ADVANCING UNIT

BACKGROUND OF THE INVENTION

The invention relates to a fluid power advancing unit, comprising a housing, a plunger adapted to slide axially in the housing for extension out from the housing owing to the supply of a drive fluid into a working space delimited by the plunger.

THE PRIOR ART

An advancing unit of this type is for instance disclosed in the German patent publication 3,537,124 A1. Here the plunger is embodied in the form of a hollow cylindrical body slide in the housing space. If a working space delimited by the plunger is supplied with compressed air, the plunger will be extended and in this manner may cause the displacement of an external object connected with the plunger.

In this form of the prior art the plunger is placed in parallel to a piston rod, with which it is coupled by a connecting member in order inter alia to prevent relative rotation. This does however lead to a relatively large overall width of the advancing unit.

SHORT SUMMARY OF THE INVENTION

One object of the invention is to provide an advancing unit of the type initially mentioned, which on the one hand ensures accurate guiding of the plunger while on the other hand leads to a compact manner of construction.

In order to achieve these and/or other objects appearing from the present specification, claims and drawings, in the present invention the plunger is designed in the form of a three-sided prismatic body at least in a part thereof able to slide in the housing, such body being guided at its three sides in the housing, whereas the three transition parts between each two respectively adjacent side surfaces are not guided.

It is in this manner that owing to the geometry of the guided longitudinal section of the plunger a rotation preventing means is provided which is well able to resist loads on it. Simultaneously owing to the flat side surface of the prismatic body accurate guiding is ensured. Since the transition parts between each two respective adjacent side surfaces, that is to say the parts of the longitudinally extending side edges of the prismatic body, are not guided, it is possible for redundant guiding effects to be excluded. Additionally the measures adopted for producing the guiding effect may be obtained very cheaply.

Advantageous further developments of the invention are recited in the claims.

The external outline of the prismatic body is conveniently so adapted to the internal outline of the housing space receiving the same that between the transition parts joining the two respective adjacent side surfaces and the respectively opposite housing surface there is a clearance. This simplifies the adjustment of the plunger in the housing during assembly of the advancing unit, since it is possible to avoid any contact between the transitions and the housing owing to redundant guiding effect.

It is an advantage if the prismatic body is rounded at the transitions.

The longitudinal guiding effect for the plunger is preferably produced by having a guide element associated with each of the three side surfaces of the prismatic body, such guide element being fixed either on the prismatic body or on the housing and cooperating with an opposite surface on the respectively other part. If one of such guide elements is additionally loaded, then owing to the prismatic form there will be a large-area guiding contact on all guide elements so that there will be a practically play-free and extremely accurate guiding action. As a suitable loading means it is possible for instance to provide a spring arrangement and/or a fluid under pressure.

The housing of the advancing unit will have a rectangular and more particularly square external cross section at least for the part of the length guiding the plunger, the prismatic plunger being so aligned that one of its side surfaces extends parallel to one of the external surface of this housing section. There is then a relatively wide zone on the housing externally able to be provided with one or more longitudinal guides for sensors, which at certain positions of the plunger produce a signal.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES.

FIG. 1 shows a first design of the advancing unit in accordance with the invention as seen in a longitudinal section taken on the section line I—I of FIG. 2, a position of the plunger which has been extended somewhat being indicated in broken lines.

FIG. 2 is a cross section taken through the advancing unit taken on the line II—II of FIG. 1.

FIG. 3 is a cross section taken through the advancing unit taken on the line III—III of FIG. 1.

DETAILED ACCOUNT OF WORKING EMBODIMENT OF THE INVENTION.

The advancing unit of the embodiment of the invention possesses an elongated housing 1, which in cross section as depicted in FIG. 2 and FIG. 3 has a rectangular and more especially square external cross section. This rectangular outline extends conveniently along the entire length of the housing.

In the interior of the housing 1 there is a housing space 2, which is open at one end 3 of the housing at an opening 4.

In the space 2 inside the housing 2 there is an elongated plunger 5 adapted for axial sliding movement, that is to say in the direction of the longitudinal axis 6 of the housing 1. Dependent on the current position of sliding, the plunger 5 extends to a greater or lesser extent past the opening 4 at the end out from the housing 1. As shown in FIG. 1 the plunger 5 has assumed its position of maximum retraction, in which its full length is practically completely, i.e. at least generally, inside the housing space 2. Furthermore, in FIG. 1 the reference numeral 7 indicates in broken lines one of the extended settings, in which the plunger 5 projects to the outside past the housing 1.

Both the outward movement and also the retraction movement of the plunger is produced in the embodiment by a fluid power medium such as compressed air, referred to in the following as drive fluid. By suitable supply and venting of the drive fluid into and out of two working spaces 8 and 9 the plunger 5 is so acted upon by pressure that it performs the desired displacement movement.

At least along its length section running in the housing 1, that is to say in the illustrated working embodiment along its entire length, the plunger is in the form of a three sided prismatic body 13. As shown in FIGS. 2 and 3 it is preferably a question of a regular prismatic body 13, whose base face is in the form of an equilateral triangle so that the three lateral surfaces 14, 15 and 16 delimiting the prismatic body 13 at the periphery thereof have the same dimensions in the peripheral direction of the plunger 5.

The alignment of the prismatic body 13 is preferably such with respect to the housing 1 that one (14) of the side surfaces extends in parallelism to one (17) of the four peripheral external surfaces of the housing 1.

The length section, which remains inside the housing space 2, of the plunger 5 is transversely laterally supported in the housing space 2 and so guided for longitudinal movement. The guiding action is performed by a plurality of guide elements 21, which are arranged in the part between the outer or prismatic surface 22 of the prismatic body 13 and the housing surface 23, which peripherally delimits the housing space 2, of the housing 1. The arrangement is in this respect preferably such that the guide elements 21 only cooperate with the three side surfaces 14, 15 and 16 of the prismatic body 13, and not however with the three transition parts 24 which are respectively provided between each two bordering side surfaces 14, 15, 16; 16 and 14. The transition parts 24 correspond practically to the part of the longitudinally extending side edges of the prismatic body 13, which in the illustrated working embodiment are however rounded. On each side surface 14, 15 and 16 there is accordingly an adjoining curved or rounded non-guided transition part 24.

The housing space 2 of the embodiment of the invention possesses a triangular prismatic configuration. The outline of the cross section may be the same as that of the prismatic body 13. It is however convenient to provide the housing space 2 with a somewhat larger cross section, in which respect the outline will be similar in the geometrical sense of the word. In this manner a peripheral annular gap 25 is produced between the prismatic surface 22 and the prismatic housing surface 23 delimiting the housing space 2, which gap 25 is locally spanned by guide elements 21 supporting the plunger 5 in relation to the housing 1.

The guide elements 21, which in the working embodiment have a tabular form, are preferably grouped in two groups of three along the periphery of the length section 12. The first group of three, consisting of the three first guide elements 21 and 21 is fixed in the housing 1 and is located in the housing space 2 adjacent to the opening 4. Each such first guide element 21 and 21 is in contact with the respectively facing flat side surface 14; 15; and 16 and bears on same in such a manner that although there is a transverse supporting action for the prismatic body 13, nevertheless an axial sliding movement is still possible. The first guide elements 21 and 21 are in this case preferably placed so that part of their thickness extends into receiving pockets 26 of the housing, which are made in the prismatic outline of the housing surface 23. It is in this manner that there is a reliable fixing action.

The above mentioned three sections of the housing surface 23 constitute, in the working embodiment, three guide surfaces 27 as well, which cooperate with the three second guide elements 21", illustrated in FIG. 3, of the second group of three of guide elements 21. These second guide elements 21 and 21" are locked in relation to the plunger and during a sliding movement of the part 5, slide along the guide surfaces 27. In order to ensure that the corresponding guide functions during the entire, maximum sliding movement of the plunger 5, the second guide elements 21" are fixed on the inner end part 28 which is always in the interior of the housing space 2, of the prismatic body 13. The configuration thereof is conveniently the same as that of the first guide elements 21' and like same they are fixed in receiving pockets 26', which are provided in the three side surfaces 14, 15 and 16 of the prismatic body 13.

Since the guide surfaces 27, like side surfaces 14, 15 and 16, are made flat, running surfaces cooperating with such surfaces of the guide elements 21 may also be made with a flat surface, something which leads to a particularly simple and low-price manufacturing process.

In order to render possible trouble-free fitting of the guide elements 21 on the housing 1 and the plunger 5, in the illustrated working embodiment an advantageous feature for compensation of play is provided. In this respect a loading means 33 is associated with each guide element 32 and 32' of the two groups of three, such loading means acting on the respective guide element 32 and 32' athwart the direction of sliding of the plunger 5 and biases the same against the facing side surface 14 or, respectively, the guide surface 27. In the illustrated working embodiment of the invention the loading means 33 is constituted by a respective spring arrangement 34, which bears between the guide element 32 and 32' and the component 1 and 5 carrying the same. In this respect the respective guide element 32 and 32' is mounted in the associated receiving pocket 26 and 26' in a transversely moving manner so that it may perform the necessary compensating movement without hinderance.

FIGS. 1 and 2 indicate the possibility of the arrangement of a loading means 33. For this purpose the housing 1 possesses a transverse hole 35, which opens adjacent to the rear side of the associated guide element 32 into the receiving pocket for the same. Exteriorly the transverse hole 35 is shut off by a cover cap 36 attached to the housing 1 and which for instance may be screwed into an internal screw thread in the transverse hole 35. In the space remaining between the cover cap 36 and the guide element 32 a spring arrangement 34 in the form of a compression spring is received, which bears against the cover cap 36, bears against the rear side of the guide element 32 and thrusts the latter against the facing side surface 14.

A similar arrangement may be also provided in the case of the guide element 32' arranged on the plunger 5. In FIG. 3 the spring arrangement 34. present is indicated in broken lines.

Preferably the loaded guide element 32 and 32' is that one, which is arranged adjacent to the side surface 14, which extends parallel to one of the external surfaces 17 of the housing 1.

It is possible to adopt measures to ensure that the pressure force of the loading means 33 may be varied by setting same. In the illustrated working embodiment of the invention the thrust or loading force is preset by the respectively selected depth of screwing in of the cover cap 36.

Instead of a mechanical loading effect it would also be possible to provide for fluid loading or biasing. In FIG. 2 a pressure line 37 is indicated in broken lines which may be connected with the transverse hole 35 in order to supply fluid under pressure to the rear side of the guide element 32. The adjustment of the pressure is preferably performed using a pressure regulating valve or, respectively, a pressure reducing valve.

Owing to the loading action on the each guide element 32 and 32' the triangular, prismatic plunger 5 is so transversely acted upon this adjacent to the two other guide elements, which are not loaded, that there is optimum contact between the same and the associated side surface 15 and 16 or, respectively, the guide surface 27.

In the illustrated working embodiment of the invention the prismatic plunger 5 possesses a tubular body 38 having the above mentioned prismatic external configuration, with a continuous concentric continuous cylinder hole 42, which is shut off at both ends by covers 43 and 44 mounted on the tubular body 38. Thus the plunger 5 has internally a sealed off space 45. In the interior of the inner space 45 a piston 46 is provided cooperating in a sealing manner with the cylindrical limiting surface of the internal space 45, such piston 46 dividing up the internal space 45 into the above mentioned first and second working spaces 8 and 9. The piston 46 is secured by means of a rod 47 to the housing 1. It is mounted on a terminal part of this rod 47, whose other terminal part is fixed on a terminal wall 48 opposite to the opening 4, of the housing 1 which extends thence through the facing cover 44 coaxially into the internal space 45. The rod 47 has a pressure fluid duct 52 extending through it in the longitudinal direction to communicate with a connecting opening 53 at the terminal housing cover 48, whereas at the other end it opens into a first working space 8 adjacent to the front housing end 3. If drive fluid is supplied through the connecting opening 53, the volume of the first working space 8 will increase and the plunger will move out of the housing 1 until the internal terminal cover 44 runs ups against the piston 46. Then the plunger 5 will be in its position of maximum advance.

The return stroke is also caused by the drive fluid. A tube 54 coaxially surrounding the rod 47 with a radial clearance is at one end attached to the said terminal housing cover 48 and extends into the housing space 2, it extending at the same time through the adjacent cover 44 and terminating in the interior of the following second working space 9 adjacent to piston 46. It is in this manner that between the rod 47 and the tube 54 an annular channel 55 is produced, which communicates in the terminal housing cover 48 with a further connecting opening 56 and at the other end of the tube 54 opens to the second working space 9. In order to retract the plunger 5, via the further connecting opening 56 drive fluid is introduced into the second working space and acts on the internal cover 54. If drive fluid is supplied to a working space 8 or 9, the respectively other working space is best simultaneously vented.

In order to ensure that no drive fluid escapes via opening 59, through which the rod 47 and the tube extend, of the internal cover 44, on same a sealing ring 57 is preferably fixed, which abuts the external surface of the tube 54 and is able to slide along same.

The advancing unit described and depicted by way of example is furthermore provided with means, which render possible an interrogation or sensing of the position of sliding of the plunger 5. Externally on the housing 1 a plurality of longitudinal guides 58 are provided, on which sensors 63 as indicated in broken lines may be secured to be actuated by a magnet arrangement 62 fixed on the plunger 5 without making contact. For the arrangement of the longitudinal guides 58 the external surface 17 has been found to be particularly suitable, which extends directly adjacent to and parallel the one side surface 14 of the prismatic body 13. The plunger 5 extends in this case for a relatively large width directly adjacent to the external surface 17 so that a plurality of longitudinal guides 58 may be provided adjacent to each other and at the same time at a constant, small distance from the plunger 5. In the illustrated working embodiment of the invention two mutually parallel longitudinal guides 58 are provided, which are designed in the form of grooves set in the external surface 17, for sensors 63. Each longitudinal guide 58 is associated with a permanent magnet part attached to the adjacent side surface 14, the magnet parts 64 being provided preferably at least partially in the respective side surface 14. In the illustrated working embodiment of the invention they are located on the internal terminal part 28 of the plunger 5 adjacent to the second guide elements 21 and 21", same being mounted in recesses in the receiving pocket 26' of the associated second guide element 21, 21" and 32" and being covered by the above mentioned guide element 21, 21" and 32'. The arrangement of the magnet arrangement 62 or, respectively, of the magnet part 64 at the terminal part 28 offers the advantage that along the entire stroke of the plunger 5 there is a possibility of detection, since the longitudinal guides 58 also extend along the full length of the housing space 2.

It is furthermore an advantage that the magnet arrangement 62 must only extend along a part of the periphery of the prismatic body 13, since there is here a means preventing relative rotation, which always ensures that the magnet arrangement 62 is in the correct position in relation to the longitudinal guides Instead of a plurality of magnet parts 64 it is also possible to provide a single magnet part associated with a plurality of longitudinal guides 58.

On the upper external surface 17' opposite to the upper external surface 17 of the housing 1 it is convenient to provide a plurality of attachment grooves 65, which may be employed for the attachment of the advance unit on another structure.

The advancing unit in accordance with the invention is characterized by having a narrow structure with a reduced number of parts. Owing to the triangular design of the plunger it is only necessary to have three surface guides distributed out over the periphery, of which two may be made rigid, whereas the third one is able to be moved transversely and by means of a more particularly spring loading action causes a self-centering action and automatic re-adjustment to take up any wear.

I claim:

1. A fluid power advancing unit, comprising: a housing having an axial bore opening at a first end thereof, a plunger adapted to slide axially in the bore of the housing for extension out from the first end of the housing owing to a supply of a drive fluid into a working space delimited by the plunger, wherein the plunger is designed in the form of a three-sided substantially triangular-shaped body at least in a part thereof able to slide in the housing, the triangular-shape preventing rotation, providing accurate guiding and being able to resist loads thereon, the plunger being guided along each of the three sides of the body, whereas three transition parts between each two respectively adjacent side surfaces are not guided thereby eliminating redundant guiding of the plunger, the advancing unit further including first guide elements fixed in the axial bore of the housing adjacent the first end thereof, and second guide elements fixed on the plunger at an end distal to the housing opening, the second guide elements sliding within the axial bore of the housing upon activation of the plunger.

2. The advancing unit as set forth in claim 1, wherein the substantially triangular-shaped body is an equilateral triangle.

3. The advancing unit as set forth in claim 1, wherein said three transition parts are arranged with a clearance between each transition part and a facing surface of the housing.

4. The advancing unit as set forth in claim 1 wherein the substantially triangular-shaped body is rounded adjacent to transition parts, the parts which are rounded not being guided.

5. The advancing unit as set forth in claim 1, wherein the first guide elements are respectively arranged opposite one of the three side surfaces of the substantially triangular-shaped body and being in engagement therewith for a guiding action on such side surface.

6. The advancing unit as set forth in claim 1, wherein the second guide elements are arranged on side surfaces of the plunger.

7. The advancing unit as set forth in claim 5, wherein the first guide elements are designed in a tabular form.

8. The advancing unit as set forth in claim 1, comprising at least one loading means associated with a guide element of one of the first and second guide elements, the loading means being adapted to thrust the respective guide element against a respective facing guide surface.

9. The advancing unit as set forth in claim 8, wherein the loading means comprises a spring arrangement.

10. The advancing unit as set forth in claim 8, wherein the loading means includes a fluid power pressure means, including a pressure controlling valve.

11. The advancing unit as set forth in claim 1, further comprising a rod being secured to a terminal housing wall axially opposite to an opening for said plunger, said rod extending into the housing and into an internal space in the plunger, said rod being coupled to a piston which divides the internal space into a working space and a further space, said rod furthermore having a pressure medium duct extending through it, which duct at one end being connected with the working space which, at another end, being connected to an opening provided in the terminal housing wall.

12. The advancing unit as set forth in claim 11, wherein the further space is also a further working space able to be supplied with drive fluid, a tube extending into such working space, said tube being fixed at the terminal housing wall and surrounding the rod with radial clearance, such tube being open toward the further working space at one end and at the other end thereof communicating with a second connection opening provided at the housing wall.

13. The advancing unit as set forth in claim 1, wherein the housing has a rectangular cross section, and wherein one side surface of the triangular-shaped body extends parallel to an external surface of the housing.

14. The advancing unit as set forth in claim 13, further including at least one longitudinal guide on the external surface of the housing, parallel to a side surface of the body, for mounting at least one sensor able to respond to a magnet arrangement attached adjacent to the said side surface on the body.

15. The advancing unit as set forth in claim 14, further comprising two adjacently placed longitudinal guides provided parallel to one another, and with which an individual magnet part of the magnet arrangement may be associated.

16. A fluid power advancing unit comprising:
   a housing having an axial bore therein opening at a first end thereof;
   a plunger adapted to slide axially in the bore of the housing for extension therefrom under the influence of a drive fluid, wherein the axial bore in the housing and the plunger are substantially triangular in cross-section;
   first guide elements fixed in the axial bore of the housing adjacent to the first end thereof; and
   second guide elements fixed on the plunger at an end distal to the housing opening, said second guide elements sliding within the axial bore of the housing upon activation of the plunger.

17. The advancing unit as set forth in claim 16, wherein the triangular-shaped plunger has rounded transition parts which are not guided by the first and second guide elements.

18. A fluid power advancing unit comprising:
   a housing having an axial bore therein opening at a first end thereof;
   a plunger adapted to slide axially in the bore of the housing for extension therefrom under the influence of a drive fluid;
   first guide elements fixed in the axial bore of the housing adjacent to the first end thereof; and
   second guide elements fixed on the plunger at an end distal to the housing opening, said second guide elements sliding within the axial bore of the housing upon activation of the plunger, wherein the first and second guide elements are tabular in form and are positioned on side guide surfaces of the axial bore and plunger, respectively.

19. The advancing unit as set forth in claim 18, further comprising a loading means associated with at least one of the first and second guide elements, the loading means being adapted to apply pressure to a guide element to thrust a respective guide element against a respective side guide surface.

* * * * *

UNITED STATES PATENT AND TRADEMARK OFFICE
CERTIFICATE OF CORRECTION

PATENT NO. : 5,609,091
DATED : March 11, 1997
INVENTOR(S) : Stoll

It is certified that error appears in the above-indentified patent and that said Letters Patent is hereby corrected as shown below:

Column 2, line 62,   now reads "the plunger is"; this should read --the plunger 5 is--.

Column 3, lines 46 and 47,   now reads "guide elements 21 and 21"; this should read --guide elements 21 and 21'--.

Column 3, lines 48 and 49,   now reads "guide element 21 and 21"; this should read --guide element 21 and 21'--.

Column 3, lines 53 and 54,   now reads "guide elements 21 and 21"; this should read --guide elements 21 and 21'--.

Column 4, line 46,   now reads "arrangement 34.  present"; this should read --arrangement 34 present--.

Column 6, line 24,   now reads "longitudinal guides"; this should read --longitudinal guides 58.--.

UNITED STATES PATENT AND TRADEMARK OFFICE
CERTIFICATE OF CORRECTION

PATENT NO. : 5,609,091

DATED : March 11, 1997

INVENTOR(S) : Stoll

It is certified that error appears in the above-indentified patent and that said Letters Patent is hereby corrected as shown below:

Column 7, line 23,        now reads "pressure means, "; this should read --pressure means--.

Signed and Sealed this

Twenty-sixth Day of August, 1997

Attest:

BRUCE LEHMAN

Attesting Officer

Commissioner of Patents and Trademarks